United States Patent [19]

Roche et al.

[11] 3,999,049
[45] Dec. 21, 1976

[54] SYNTHESIZER OF MULTIFREQUENCY CODE SIGNALS

[76] Inventors: Bernard G. Roche, Pavillon 18, Residence de Bourgogne, Lannion, France, 22300; Jean E. Milon, Kerlerranouet, Perros-Guirec, France, 22700

[22] Filed: Sept. 29, 1975

[21] Appl. No.: 617,839

[30] Foreign Application Priority Data

Sept. 30, 1974 France ............................ 74.32909

[52] U.S. Cl. ............................ 235/152; 179/90 K; 328/14; 331/48
[51] Int. Cl.² ........................................ G06F 15/20
[58] Field of Search .......... 235/150.3, 152; 328/14, 328/30, 39; 331/48, 51; 179/84 T, 90 K

[56] References Cited

UNITED STATES PATENTS

| | | | |
|---|---|---|---|
| 3,701,027 | 10/1972 | Belton, Jr. ........................ 328/39 X |
| 3,719,897 | 3/1973 | Tarr ........................ 331/51 |
| 3,761,642 | 9/1973 | Lind ........................ 179/90 K |
| 3,787,836 | 1/1974 | Hagelbarger ........................ 328/14 X |
| 3,820,028 | 6/1974 | Thomas ........................ 328/14 |
| 3,824,484 | 7/1974 | Gillette ........................ 331/48 |
| 3,832,639 | 8/1974 | Janssen ........................ 328/14 |

Primary Examiner—Jerry Smith

[57] ABSTRACT

Synthesizer of multifrequency signals for telephone sets, each multifrequency signal being formed by two concomitant sinusoidal signals of different basic frequencies, said frequencies forming pairs respectively corresponding to the decimal digits and being sub-multiples of a common clock frequency. The sinusoidal signals are pulse trains whose repetition rate varies steppedly in function of time in the following manner. The period of a sine function is divided into $p$ parts and the amplitude of the function taken from the tangent to the negative peaks of the sine curve for $p$ equidistributed values of the argument $2\pi i/p$, $i$ varying from $1$ to $p$, are approximated by $p$ amplitude values. The periods of the signals having the basic frequencies are divided into $p$ time intervals and during these time intervals, a pulse train generator is operated in such a way that its pulse repetition rate be proportional to said amplitude values.

6 Claims, 11 Drawing Figures

THE NUMBER OF INTERNAL PULSES IN EACH GATING SIGNAL IS INDICATED BENEATH EACH GATING SIGNAL 3001-3007

SYNTHESIZER OF MULTIFREQUENCY CODE SIGNALS

CROSS REFERENCE TO RELATED APPLICATIONS

Applicants make reference to their French Pat. Application No. PV 74-32909, filed Sept. 30, 1974 and claim priority thereunder in accordance with the provisions of 35 U.S.C. 119.

BACKGROUND OF THE INVENTION

1. Field of the Invention

This invention relates to a synthesizer of multifrequency code signals for a keyboard telephone station, more particularly to a generator producing dialling signals or more generally signalling signals embodied by frequencies associated $m$ by $m$ in a "$m$ out of $M$" code, usually two by two in a "two out of M" code to represent the decimal dialling digits and, if necessary, other signalling-service signals. Such a dialling code can be e.g. the multifrequency code recommended by the CCITT (International Telegraph and Telephone Consultative Committee). In the multifrequency code used here the frequencies of the code are voiceband frequencies which, allowing for a tolerance, are integral sub-multiples of a single fundamental frequency.

2. Description of the Prior Art

Synthesizers of the kind considered are known, inter alia from patent application Ser. No. 617,488 filed Sept. 29, 1975 corresponding to French Pat. Application 74-32908, filed Sept. 30, 1974 in the names of Bernard Roche, Jacques Majos and Jean-Louis Lardy, which use a read only memory containing digital samples of a sine function corresponding to equidistributed values of the angular argument. The depression of a key of the keyboard selects two indices or increments $i$ and $'$ and causes the read-out at a constant rate of the samples which are contained in the read only memory and which are read from $i$ to $i$ to produce a digital sinusoidal signal at a first frequency and from $i'$ to $i'$ to produce a digital sinusoidal signal at a second frequency.

Although the invention of the copending U.S. application Ser. No. 617,488 has due regard for the symmetry of the sinusoidal function so as to store only digital samples of the function corresponding to equidistributed values of the angular argument only lying between 0 and $\pi/2$, the need to have a store for sinusoidal-function digital samples in the dialling generator of each keyboard telephone stations adds considerably to the cost of such generator, and it is an object of this invention to make it unnecessary to use such a store.

SUMMARY OF THE INVENTION

In general terms, the synthesizer according to this invention delivers the sinusoidal signal not in the form of a sequence of PCM words removed from a read only memory and representing consecutive samples of the sinusoidal signal but in the form of a sequence of $p$ pulse trains each of a length equal to the $p$th part of the period $1/f_i$ of the sinusoidal signal to be produced and each having a density predetermined by the rank of the train in the sequence.

To give an immediate ideal, if it is assumed that the ordinates of a sine curve from a tangent to its negative peaks are 0, 1, 4, 8, 12, 15, 16 for values of the argument of $-\pi/2$, $-\pi/3$, $-\pi/6$, 0, $\pi/6$, $\pi/3$, $\pi/2$ respectively, the sinusoidal signal of frequency $f_i$ is represented by the combination of twelve trains each of a length $1/12 f_i$ and of pulse densities (or repetition frequencies) proportional consecutively to 0, 1, 4, 8, 12, 15, 16, 15, 12, 8, 4, 1.

BRIEF DESCRIPTION OF THE DRAWING

The invention will now be described in detail with reference to the accompanying drawings wherein.

DESCRIPTION OF THE PREFERRED EMBODIMENTS

Figure 1:
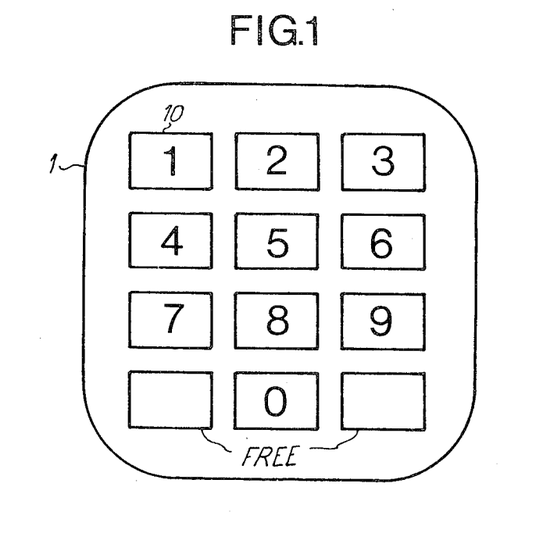
FIG. 1 shows the arrangement of keys on a telephone station having a multifrequency keyboard.

FIG. 1 shows keys 10 which make up a keyboard 1 of a multifrequency telephone station. When the user operates any of the keys numbered 1 to 0, there is a selective transmission of signals marked 1, 2, 3 and so on up to 0 and the synthesizer produces two sinusoidal signals in "2 out of 5" code which are transmitted over the telephone line connected to the keyboard station and whose frequencies —a low frequency $f_i$ and a high frequency $f_{i'}$ - are, as an example, given in hertz in the following table.

TABLE I

| $f_{i'}$ \ $f_i$ | 697 | 770 | 852 | 941 |
|---|---|---|---|---|
| 1209 | 1 | 4 | 7 | Fr |
| 1336 | 2 | 5 | 8 | 0 |
| 1477 | 3 | 6 | 9 | Fr |
| 1633 | Fr | Fr | Fr | Fr |

Fr = free

Allowing for tolerances, the selected frequencies have a common submultiple and a common multiple as follows:

$697 = 17 \times 40.6 = 27800/40$ $770 = 19 \times 40.6 = 27800/36$

852 = 21 × 40.6 = 27800/33

941 = 23 × 40.6 = 27800/30

1209 = 30 × 40.6 = 27800/23

1336 = 33 × 40.6 = 27800/21

1477 = 36 × 40.6 = 27800/19

1633 = 40 × 40.6 = 27800/17 since the multiplication and division factors are approximately in accordance with the following conditions:

$$17 \times 40 \approx 19 \times 36 \approx 21 \times 33 \approx 23 \times 30.$$

Figure 2:
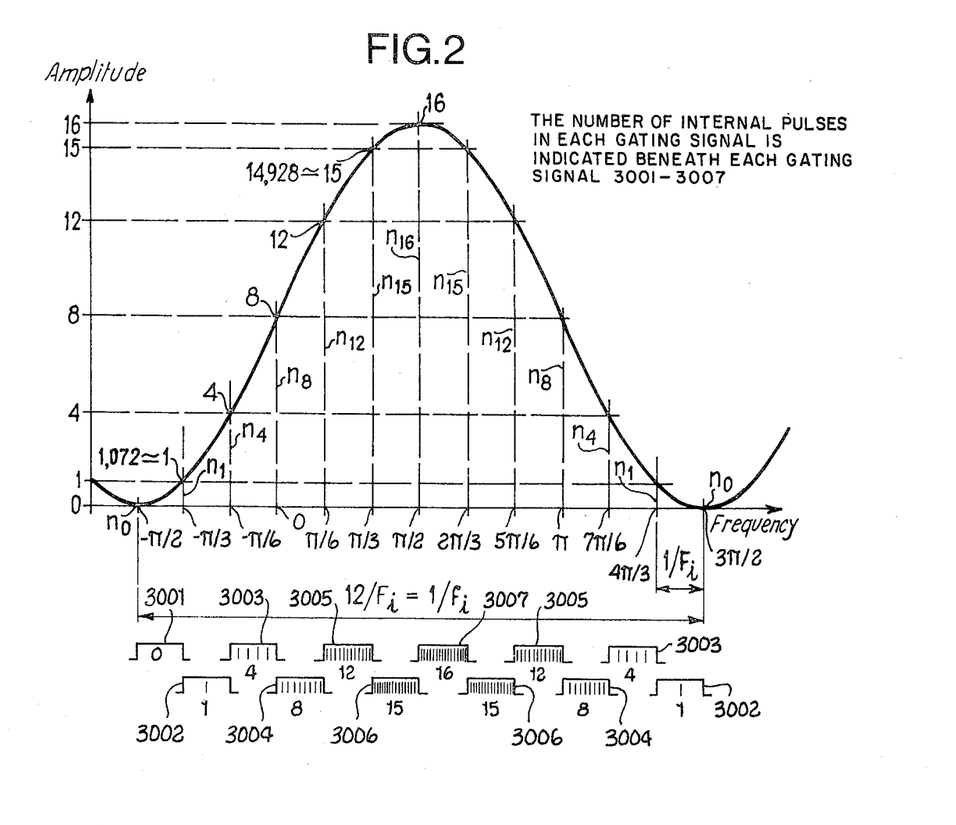
FIG. 2 shows a sine curve and the exact and approximate values of its ordinates from the tangent to its negative peaks for increments of $\pi/6$ of the argument.

FIG. 2 shows a sine curve whose period is divided from a negative peak into 12 equal parts each of a common width $\pi/6$, FIG. 2 also showing the exact and approximate values of the ordinates from a tangent to the negative peaks of the curve. The amplitude of the sine curve is taken to be 8 and the value $8 \sin \pi/3$ is approximated to by 7.

The following table sums up FIG. 2.

| argument $\phi$ | $-\pi/2$ | $-\pi/3$ | $-\pi/6$ | 0 | $+\pi/6$ | $+\pi/3$ | $+\pi/2$ |
|---|---|---|---|---|---|---|---|
| sinus $\phi$ | $-1$ | $-0,866$ | $-0,5$ | 0 | $+0,5$ | $+0,866$ | $+1$ |
| $8(1+\sin\phi)$ | 0 | $+1,072$ | $+4$ | $+8$ | $+12$ | $+14,928$ | $+16$ |
| retained value | 0 | 1 | 4 | 8 | 12 | 15 | 16 |

Figure 3:
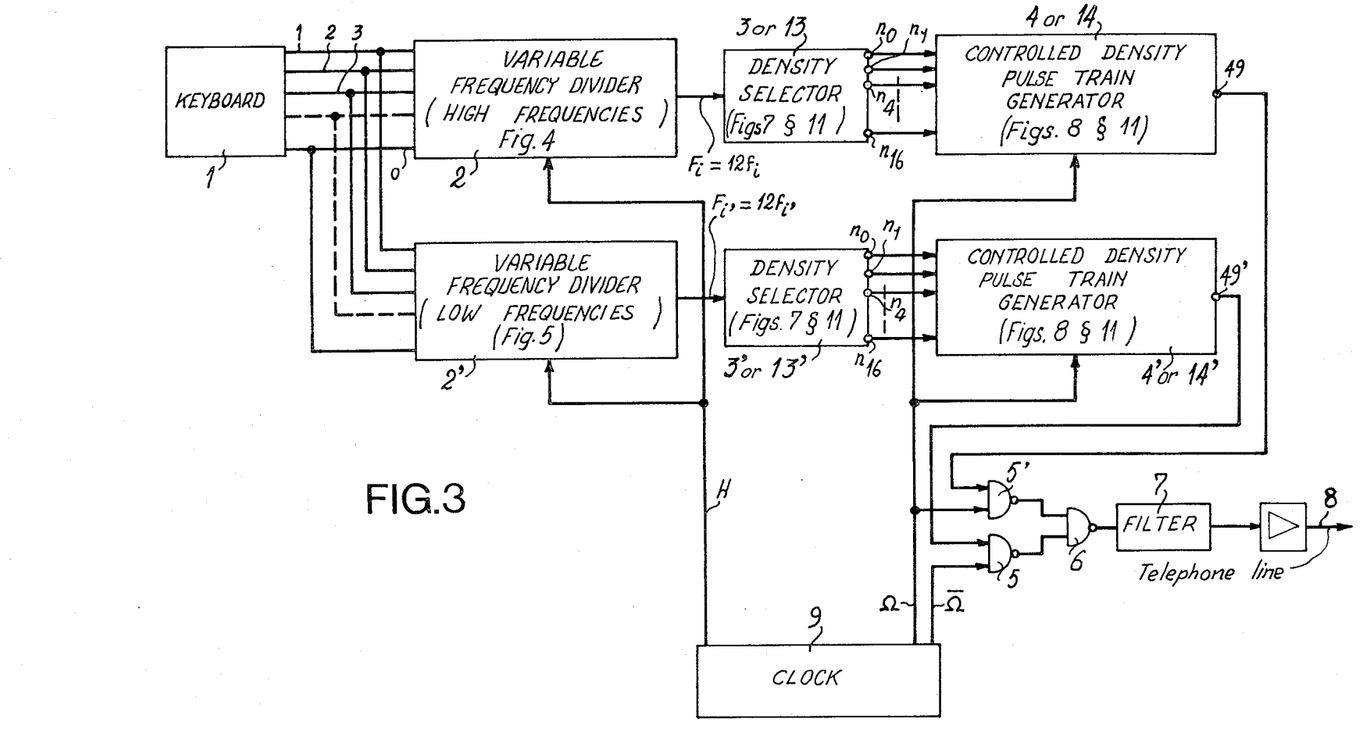
FIG. 3 shows, in the form of a very concentrated block diagram, the digital generator or synthesizer of sinusoidal signals associated two by two according to the invention.

Referring to the block schematic diagram of FIG. 3, keyboard 1 is connected to a frequency divider 2 for the high frequencies and to a frequency divider 2' for the low frequencies; the division factors of the frequency dividers are determined selectively by the keyboard key depressed by the user. The two frequency dividers receive timing pips from a clock or time base 9 and produce pulses at frequencies $12f_i$ and $12f_{i'}$. The pulses are applied to density selectors 3, 3' respectively which scan a number of terminals $n_o$, $n_1$, $n_4$, $n_8$, $n_{12}$, $n_{15}$, $n_{16}$, producing staggered and adjacent signals cyclically at such terminals.

The density selectors 3, 3' are connected to controlled-density pulse train generators 4, 4' respectively producing pulse trains of the same width and having repetition rates or densities proportional to $j$ when controlled by a signal from the terminal $n_j$. The pulse train generator output signals are chopped in gates, 5, 5' so as to prevent any pulses coincidence and to interlace the pulses from generator 4 with the pulses from generator 4'. The outputs of gates 5, 5' are combined into a single output by gate 6. The output of gate 6 is connected to a low-pass filter 7 which is connected via an amplifier to telephone line 8.

A time base or clock 9 provides pulses H or Ω to the various circuits of the device.

Figure 4:
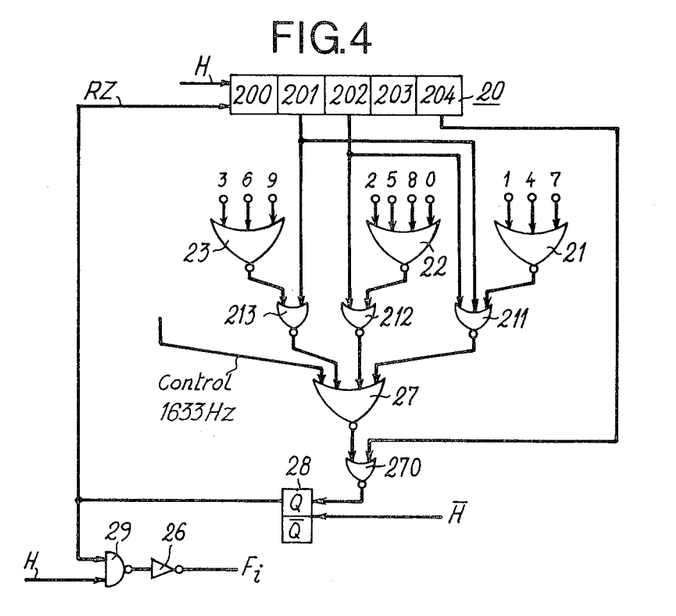
FIG. 4 shows the controlled division factor frequency divider for high frequencies.

FIG. 4 shows the controlled-division-factor frequency divider 2 for high frequencies. The divider 2 comprises a counter 20 having a number of binary stages equal to the number of bits in the greatest divider of the time-base frequency. Since such divider is 23 in the case of high frequencies, the counter has five stages 200 to 204. The counter 20 receives the timing pulses or signals H output by the time base 9.

The outputs of key groups 1 – 4 – 7, 2 – 5 – 8 – 0 and 3 – 6 – 9 are connected to NOR-gates 21–23 respectively producing signals:

$\overline{1+4+7}$ $\overline{2+5+8+0}$ $\overline{3+6+9}$

The outputs of gate 21 and of stages 201, 202 of counter 20 are connected to NOR-gate 211; the same is therefore open (conductive) when any of keys 1 or 4 or 7 is depressed and the counter marks 22. The outputs of gate 22 and of stage 202 of counter 20 are connected to NOR-gate 212; the same is therefore conductive when any of keys 2 or 5 or 8 or 0 is operated and the counter marks 20. The outputs of gate 23 and of counter stage 201 are connected to NOR-gate 213; the same is therefore open when any of keys 3 or 6 or 9 is operated and the counter marks 18.

It is to be noted that when the counter marks 22=10110, stages 201, 202 and 204 are operated, when the counter marks 20=10100, stages 202 and 204 are operated and when the counter marks 18=10010, stages 201 and 204 are operated. Theoretically, stages 201, 202 and 204 would have to be connected to gate 211, stages 202 and 204 to gate 212 and stages 201 and 204 to gate 213. In fact, stage 204 is not connected to the three gates but instead it is connected to an output NOR-gate 270. Finally, gate 270 is open when the counter contains the numbers P–1 = 16; 18; 20; 22 — i.e., when P = 17; 19; 21; 23.

The outputs of gates 211–213 are connected to the inputs of a NOR-gate 27 whose output is connected to the 1-input of a bistable 28 by way of gate 270. Bistable 28 is zero reset by timing signal $\overline{H}$. Output Q of bistable 28 is connected to a NAND gate 29, whose output is the frequency divider output, and to the zero-resetting input of counter 20.

Figure 6:
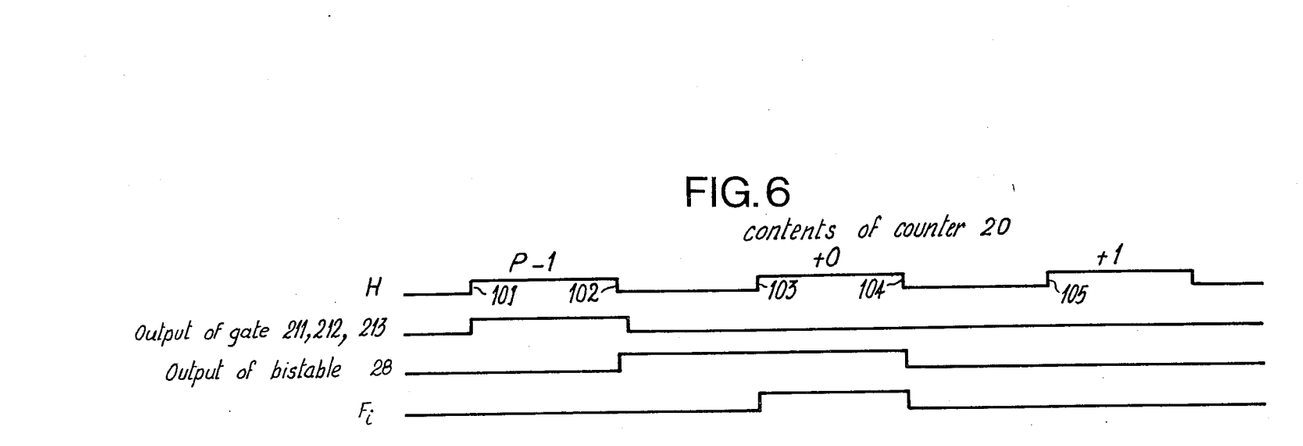
FIG. 6 is a diagram of signals as an aid to explaining operation of the frequency dividers of FIGS. 4 and 5.

Frequency divider 2 operates as follows:

It will be assumed, with reference to FIG. 6, that after the positive edge 101 of a timing pulse the counter 20 contains one of the numbers (P–1) for which one of the gates 211–213 is conductive. The output of the particular gate concerned changes over to the 1-state and the descending edge 102 of the timing pulse zero-resets counter 20. Edge 103 does not step counter 20 on since the bistable output Q is still 1. Edge 104 changes over output Q to 0 and edge 105 steps counter 20 on by 1 unit. Clearly, therefore, the output signal has a frequency equal to the timing frequency divided by P. The timing frequency selected is 27800 × 12≈333.6 kHz.

Figure 5:
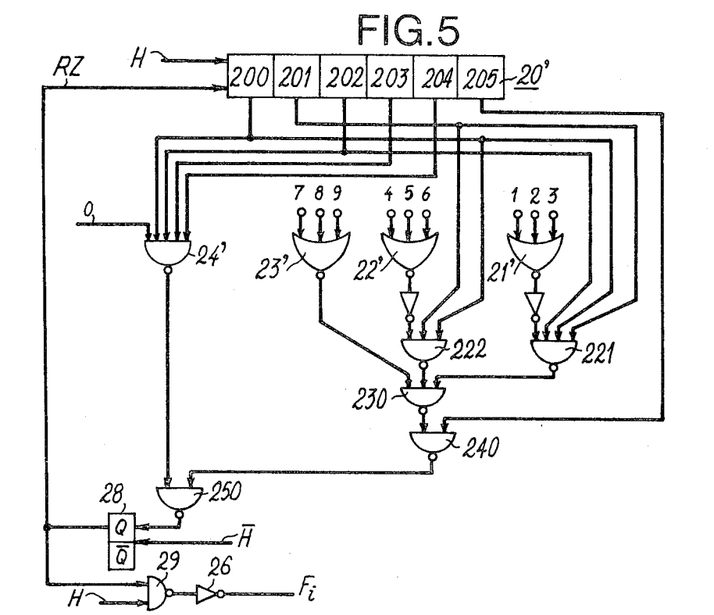
FIG. 5 shows the controlled division factor frequency divider for low frequencies.

The low-frequency divider is shown in FIG. 5 and except for some differences is very similar to the high-frequency divider. Its counter 20' has an extra stage 205 since the maximum divisor for the low-frequency divider is 40 which is stated in 6 bits.

The NOR-gates 21', 22', 23' are comparable to the NOR-gates 21, 22, 23. The output of gate 21' is connected to a NAND-gate 221 which is also connected to stages 200, 201, 202 of counter 20'. The output of gate 22' is connected to a NAND gate 222 which is also connected to stages 200 and 201 of counter 20'. The outputs of gates 221, 222 and 23' are connected to the inputs of a NAND gate 230. The output of gate 230 and the output of stage 205 are both connected to a NAND gate 240. The outputs of stages 200, 202-204 and the output of the O key are connected to a NAND gate 24'. The outputs of the gates 240, 24' are connected to a NAND gate 250 whose output is connected to bistable 28. Clearly, the gates 21', 22', 23', 24' are open (conductive) when the counter marks 29, 32, 35 and 38 respectively — i.e., when P = 30, 33, 36 and 40 respectively. The stages whose states have no significance for the counts concerned are not connected to the gates.

Figure 7:
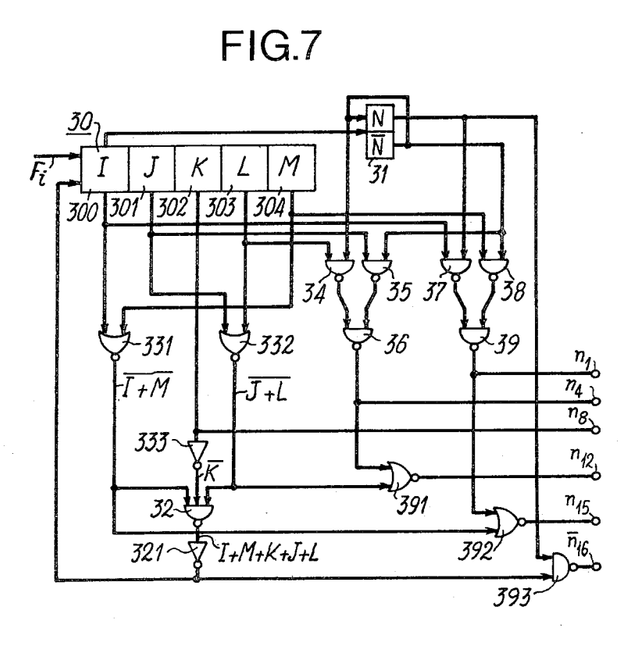
FIG. 7 shows the density or repetition frequency selector.

The density selector is an address scanner means which consecutively scans $n = 7$ terminals first in one direction then in the other and so on and is shown in FIG. 7.

It successively applies to these seven terminals $n_0$, $n_1$, $n_4$, $n_8$, $n_{12}$, $n_{15}$, $n_{16}$ gating signals 3001 to 3007 having a common duration $1/12f_i$ which serve to activate the seven pulse train generators. Since the recurrence frequency of one of these pulse generators is zero, it can be omitted and consequently the density selectors 3 or 13 are shown in FIG. 3 with seven terminals while in FIG. 7 the density selector which is represented in detail has only six terminals, the terminal $n_0$ being disregarded in this latter FIG. Gating signals 3001 to 3007 are shown in FIG. 2, respectively, including 0, 1, 4, 8, 12, 15, 16 internal pulses. The density selector comprises a shift register 30 having five stages 300 to 304 associated with a type D bistable 31. The same changes its state when a 1 is introduced into register stage 300. Two NOR-gates 331, 332 and a NAND-gate 32 detect the presence of five zeroes in the register, a condition which causes a 1 to be introduced at the register input. Other gates 34–39 serve to make the required addresses succeed one another. If the shift register contents are called I J K L M, then the NOR-gates 331 and 332 deliver $\overline{I+M}$ and $\overline{J+L}$ -i.e., $\overline{I}.\overline{M}$ and $\overline{J}.\overline{L}$ respectively- and the inverter 333 outputs $\overline{K}$. The NAND-gate 32 therefore outputs $\overline{I+J+K+L+M}$.

The density selector, which has terminals, $n_0$, $n_1$, $n_4$, $n_8$, $n_{12}$, $n_{15}$, $n_{16}$, operates upon the appearance of a 1 to put the controlled-density pulse train generator 4 into a position in which the pulse density is proportional to the index of $n$.

The following table shows how the counter contents develop from the time at which the counter marks 0 and which corresponds to zero density. A 1 is then output by inverter 321 and is applied to the input of the counter, in which it advances from stage 300 to the subsequent stages at the frequency $F_i$. The table also shows the logical relationships leading to the appearance of a 1 at terminals $n_0$, $n_1$, $n_4$, $n_8$, $n_{12}$, $n_{15}$, $n_{16}$ respectively.

TABLE II

|        | I | J | K | L | M | N |
|--------|---|---|---|---|---|---|
| $n_0$    | 0 | 0 | 0 | 0 | 0 | 0 |
| $n_1$    | 1 | 0 | 0 | 0 | 0 | 1 |
| $n_4$    | 0 | 1 | 0 | 0 | 0 | 1 |
| $n_8$    | 0 | 0 | 1 | 0 | 0 | 1 |
| $n_{12}$   | 0 | 0 | 0 | 1 | 0 | 1 |
| $n_{15}$   | 0 | 0 | 0 | 0 | 1 | 1 |

TABLE II-continued

|        | I | J | K | L | M | N |
|--------|---|---|---|---|---|---|
| $n_{16}$   | 0 | 0 | 0 | 0 | 0 | 1 |
| $n_{15}$   | 1 | 0 | 0 | 0 | 0 | 0 |
| $n_{12}$   | 0 | 1 | 0 | 0 | 0 | 0 |
| $n_8$    | 0 | 0 | 1 | 0 | 0 | 0 |
| $n_4$    | 0 | 0 | 0 | 1 | 0 | 0 |
| $n_1$    | 0 | 0 | 0 | 0 | 1 | 0 |
| $n_0$    | 0 | 0 | 0 | 0 | 0 | 0 |
| $n_1$    | 1 | 0 | 0 | 0 | 0 | 1 |

$n_{16} = N.(\overline{I+J+K+L+M})$    (1)

$n_{15} = I\overline{N} + MN$ $n_{12} = J\overline{N} + LN$ $n_8 = K$ $n_4 = L\overline{N} + JN$    (2)

$n_1 = M\overline{N} + IN$    (3)

$n_0 = \overline{N.(\overline{I+J+K+L+M})}$

The signal at terminal $n_0$ does not have to be processed, for if the other terminals are in the 0 state the generator 4 does not output any signal.

Clearly, the NAND gates 34–36 are fulfilling condition (2), the gates 37–39 are fulfilling condition (3) and gate 393 is fulfilling condition (1). In the operative state I and M cannot both simultaneously be 1, and nor can J and L (since there is at most only a single 1 in register 30) so that terminals $n_{15}$ and $n_{12}$ can be controlled by the conditions:

$n_{12} = (J+L).\overline{n}_4$ $n_{15} = (I+M).\overline{n}_1$ respectively, provided by the NOR-gates 391 and 392.

As previously stated, the density selector is an address decoder which scans a sequence of addresses first in one direction and then in the other. The density selector could of course be devised in some other way than is shown in FIG. 7. The system shown in FIG. 7 has the advantage of satisfactory stability since an interfering pulse causes a disturbance lasting at most four sampling periods $1/12f_i$ and at start-up the same length of time is the maximum time needed to reach the normal sequence.

Figure 8:
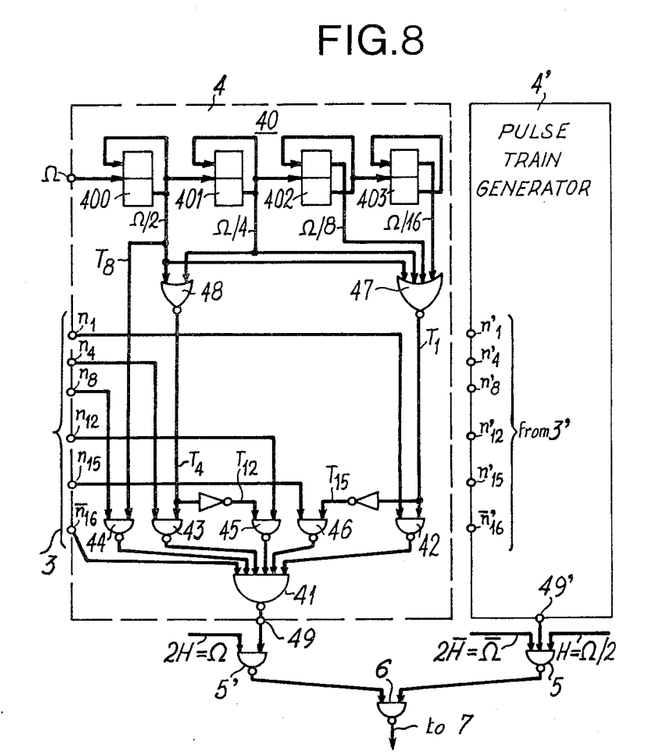
FIG. 8 shows the generator of controlled-repetition-rate pulse trains.

The generators 4, 4' must provide pulse trains whose densities —i.e., whose number of pulses per second— are in the ratios of 1, 15/16, 12/16, 8/16, 4/16, 1/16, 0. As represented in FIG. 8, each generator comprises a binary demultiplier type frequency divider 40 having four bistables 400–403; the divider receives a pulse train of frequency $\Omega$ and provides at the output of each bistable pulse trains having the frequencies $\Omega/2$, $\Omega 14$, $\Omega/8$ and $\Omega/16$ respectively. The bistables 400–403 can be the same as the bistables of counter 20. By means of the four latter pulse trains the generator 4 prepares pulse trains $T_1$, $T_4$, $T_8$, $T_{12}$, $T_{15}$, $T_{16}$ in which the pulses have the following lengths and repetition rates:

| Pulse trains | Duration | Repetition rate |
|---|---|---|
| $T_1$ | $1/\Omega$ | $16/\Omega$ |
| $T_4$ | $1/\Omega$ | $4/\Omega$ |
| $T_8$ | $1/\Omega$ | $2/\Omega$ |
| $T_{12} = \overline{T}_4$ | $3/\Omega$ | $4/\Omega$ |
| $T_{15} = \overline{T}_1$ | $15/\Omega$ | $16/\Omega$ |

-continued

| Pulse trains | Duration | Repetition rate |
|---|---|---|
| $T_{16}$ = a permanent 1 | | |

Figure 9:
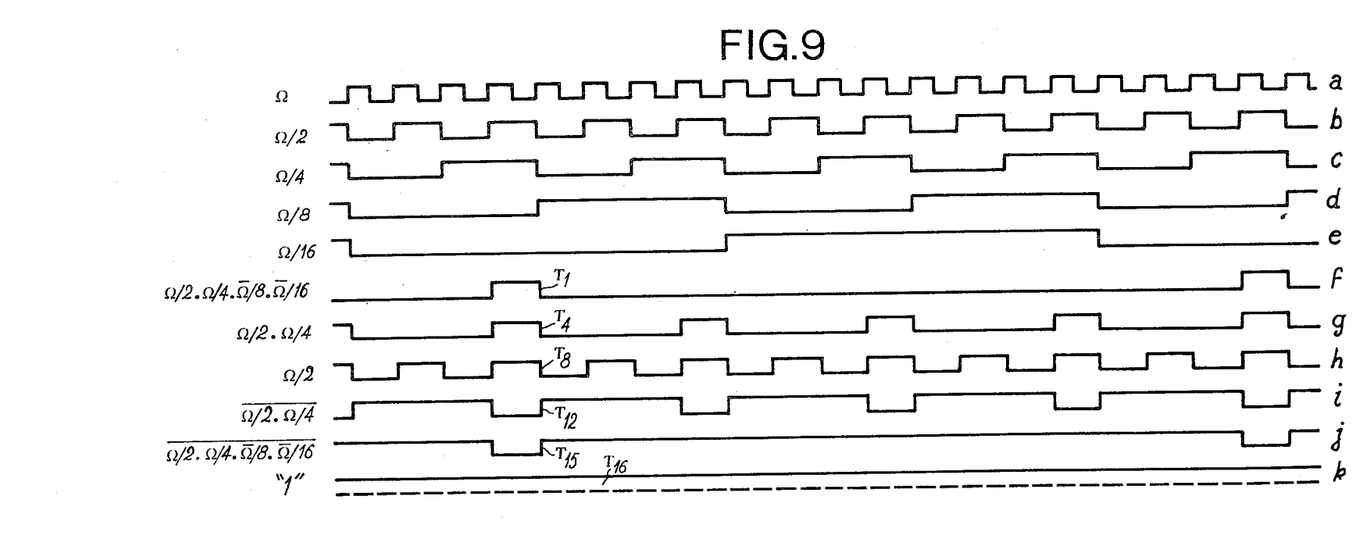
FIG. 9 is a diagram showing signals as an aid to explaining the operation of the pulse train generator of FIG. 8.

The pulse train $T_1$, corresponding to line $f$ in FIG. 9, is prepared by NOR-gate 47 which performs the operation:

$$\frac{(\Omega/2) \cdot (\Omega/4) \cdot \overline{(\Omega/8)} \cdot \overline{(\Omega/16)}}{\overline{\Omega/2} + \overline{\Omega/4} + \Omega/8 + \Omega/16}$$

The pulse train $T_4$, shown on line g of FIG. 9, is prepared by NOR-gate 48 which performs the operation:

$$(\Omega/2).(\Omega/4) = \overline{\overline{\Omega/2} + \overline{\Omega/4}}$$

The pulse train $T_8$, shown on line $h$ of FIG. 9, is merely the pulse train of frequency $\Omega/2$.

The pulse train $T_{12}$, shown on line $i$ of FIG. 9, is merely $\overline{T}_4$.

The pulse train $T_{15}$, shown on line $j$ of FIG. 9, is merely $\overline{T}_1$.

The pulse train $T_{16}$, which is a permanent 1, is shown on line $k$ of FIG. 9.

If the references $n_0, n_1, n_4, n_8, n_{12}, n_{15}, n_{16}$ are used to denote not only the density selector output terminals but also the contiguous signals of common length $1/12f_i$ appearing at such terminals, the pulse train generator gives the product:

$$n_1 T_1 + n_4 T_4 + n_8 T_8 + n_{12} T_{12} n_{15} T_{15} + n_{16} T_{16} \quad (4)$$

Accordingly, there are applied to the NAND-gate 41:
the signal $\overline{n_1 T_1}$ delivered by NAND-gate 42;
the signal $\overline{n_4 T_4}$ delivered by NAND-gate 43;
the signal $\overline{n_8 T_8}$ delivered by NAND-gate 44;
the signal $\overline{n_{12} T_{12}}$ delivered by NAND-gate 45;
The signal $\overline{n_{15} T_{15}}$ delivered by NAND-gate 46;
the signal $\overline{n}_{16}$.
The NAND-gate 41 therefore outputs:

$$\overline{(\overline{n_1 T_1}).(\overline{n_4 T_4}).(\overline{n_8 T_8}).(\overline{n_{12} T_{12}}).(\overline{n_{15} T_{15}}).\overline{n}_{16}}$$

i.e. the signal (4).

The signal output at terminal 49 of pulse train generator 4 and the signal output at terminal 49' of pulse train generator 4' are chopped by the signals $\Omega$ and $\overline{\Omega}$ respectively for interlacing through the agency of the gates 5 and 5' (FIG. 3).

To compensate for the effect of the low-pass filter 7 the density of the low frequencies can be attenuated by 6 dB relatively to the density of the high frequencies. Accordingly, and as shown in FIG. 8, generator 4' is controlled by a frequency which is twice the frequency controlling the generator 4, and as chopping signals the signal $\overline{\Omega} = 2 \overline{H}$ is applied to gate 5 and the signal $\Omega/2 = H$ is applied to gate 5' (to obviate coincidences, the signal $\Omega/2$ is not the signal shown on line $b$ of FIG. 9 but a signal of the same frequency whose impulses are half the length —i.e., the signal $2H.\overline{H}$).

Figure 10:
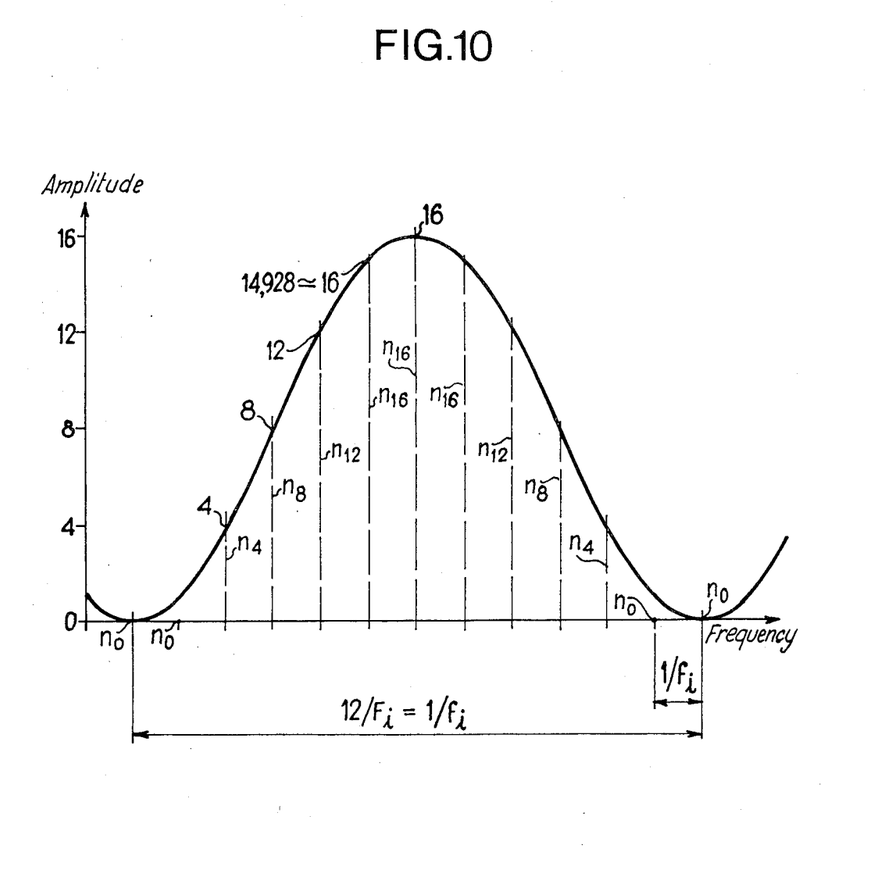
FIG. 10 shows a sine curve and the exact and approximate values of its ordinates from the tangent to its negative peaks for increments of $\pi/6$ of the argument, the approximation being looser than in FIG. 2.

A description will now be given of a simplified variant of the calling generator according to the invention wherein the sine curve is quantized in a different way from the manner shown in FIG. 2. The corresponding sampling is shown in FIG. 10 and given in the following table:

TABLE III

| argument $\phi$ | $-\pi/2$ | $-\pi/3$ | $-\pi/6$ | 0 | $+\pi/6$ | $+\pi/3$ | $+\pi/2$ |
|---|---|---|---|---|---|---|---|
| sine $\phi$ | −1 | −0,866 | −0,5 | 0 | +0,5 | +0,866 | +1 |
| 8(1+sin$\phi$) | 0 | +1,072 | +4 | +8 | +12 | +14,928 | +16 |
| retained value | O | O | 4 | 8 | 12 | 16 | 16 |

A comparison between Tables I and III reveals the following differences. In Table III:

$1 + \sin(-\pi/3) \approx 0$ $1 + \sin(\pi/3) \approx 2$

The density selector now has 5 instead of 7 output terminals (including the terminal $n_0$) —i.e., $n_0, n_4, n_8, n_{12}, n_{16}$— and 4 instead of 6 (not including the terminal $n_0$). The selector output terminals must be scanned in the order:

$n_0, n_0, n_4, n_8, n_{12}, n_{16}, n_{16}$ and the pulse train generators must output the signal:

$$n_4 T_4 + n_8 T_8 + n_{12} T_{12} + n_{16} \quad (5)$$

The Table showing the development of the contents of the counter 30 and the logical relationships leading to the appearance of a 1 at terminals $n_0, n_4, n_8, n_{12}, n_{16}$ in the order and with the repetitions previously mentioned are given in the following.

TABLE IV

| | I | J | K | L | M | N |
|---|---|---|---|---|---|---|
| $n_8$ | 0 | 0 | 0 | 0 | 0 | 0 |
| $n_4$ | 1 | 0 | 0 | 0 | 0 | 1 |
| $n_0$ | 0 | 1 | 0 | 0 | 0 | 1 |
| $n_0$ | 0 | 0 | 1 | 0 | 0 | 1 |
| $n_0$ | 0 | 0 | 0 | 1 | 0 | 1 |
| $n_4$ | 0 | 0 | 0 | 0 | 1 | 1 |
| $n_8$ | 0 | 0 | 0 | 0 | 0 | 1 |
| $n_{12}$ | 1 | 0 | 0 | 0 | 0 | 0 |
| $n_{16}$ | 0 | 1 | 0 | 0 | 0 | 0 |
| $n_{16}$ | 0 | 0 | 1 | 0 | 0 | 0 |
| $n_{16}$ | 0 | 0 | 0 | 1 | 0 | 0 |
| $n_{12}$ | 0 | 0 | 0 | 0 | 1 | 0 |
| $n_8$ | 0 | 0 | 0 | 0 | 0 | 0 |
| $n_4$ | 1 | 0 | 0 | 0 | 0 | 1 |

We have:

$n_{16} = (J+K+L).\overline{N} = \overline{(\overline{J+L+L})+N}$ (6)

$n_{12} T_{12} = (I+M).\overline{N} = \overline{\overline{(I+M}+N)}.\Omega/2.\Omega/4$ (7)

$n_8 T_8 = \overline{I+J+K+L+M} = (\overline{J+K+L}.\overline{I+M}).\Omega/2$ (8)

$n_4 T_4 = (I+M).N = \overline{\overline{(J+M)}+\overline{N})}.\Omega/2.\Omega/4$ (9)

$n_0 = (J+K+L).N$

As in the previous case the signal at terminal $n_0$ does not have to be processed.

Figure 11:
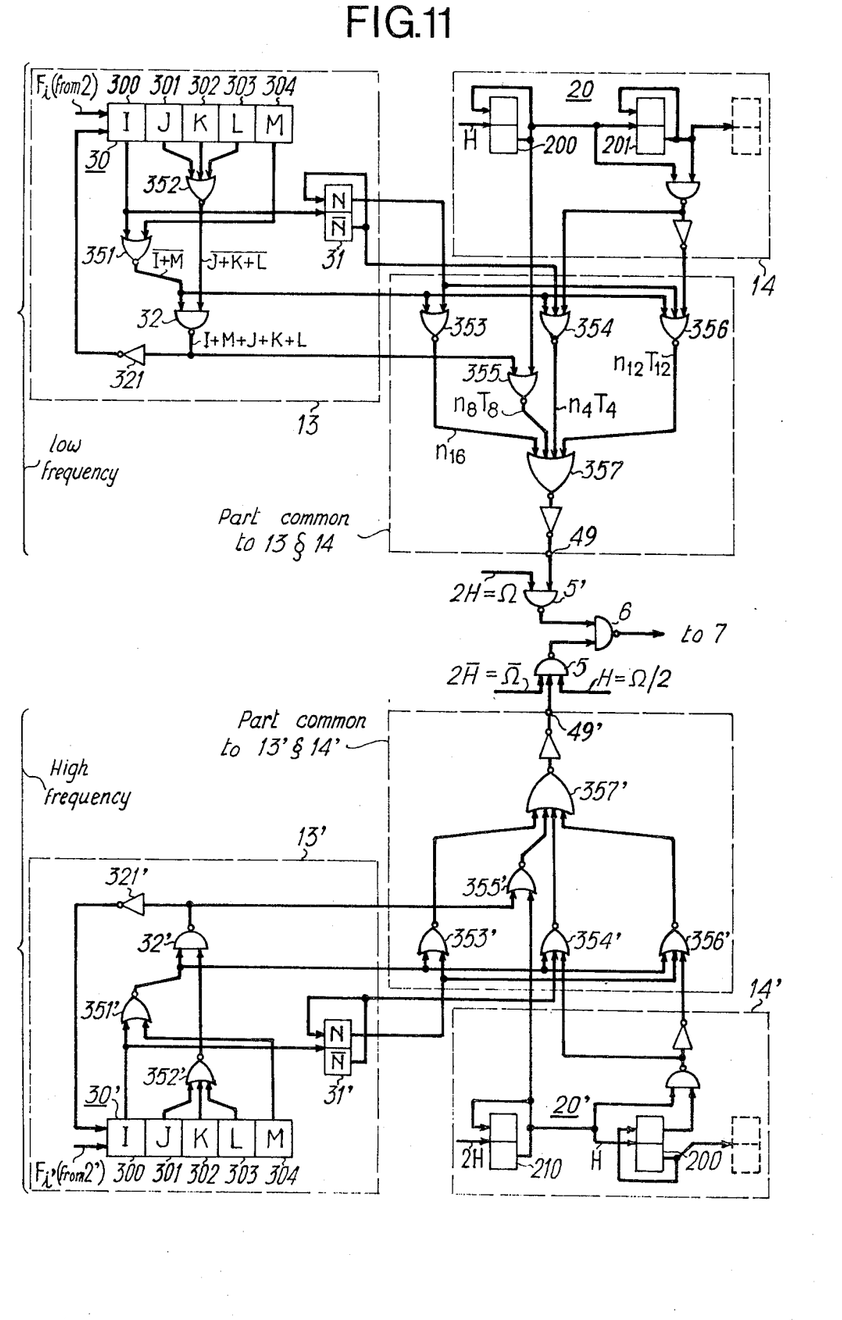
FIG. 11 shows the logic sheme of the density selectors and pulse train generators in the case of the approximation shown in FIG. 10.

Whereas the data selector 3, on the one hand, which delivers addresses on seven terminals to the pulse train generator 4 and, on the other hand, the generator 4 which outputs the basic pulse trains and prepares the pulse trains of required density are shown in FIGS. 7 and 8 separately, both the data selector 13 and the pulse train generator 14 are shown in FIG. 11, for there is no need to prepare both the signals $n_j$ and the signals $T_k$ since the same gates can be used to prepare the products $n_j T_j$ from the bits I, J, K, L, M, N and from the $T_k$'s. Formula (5) therefore becomes:

$$n_{16} + T_4 (I+M).\overline{N} + n_8 T_4 (J+M).N \qquad (10)$$

FIG. 11 shows the selectors 13, 13' and the pulse train generators 14, 14' for high and low frequencies respectively. The reference numbers are not primed for the high frequencies and are primed for the low frequencies. Only a single selector and only a single generator will be described.

In FIG. 11 there again can be seen the shift register 30, the type D bistable 31, the NAND-gate 32 and the inverter 321 of FIG. 7, and the bistables of frequency divider 40 of the pulse train generator 4. It has been assumed (since it represents an advantage of the synthetizer according to the invention) that the latter bistables were merely the bistables 200, 201 of counter 20 and the bistable 200 of counter 20'. The latter bistable is preceded by a bistable 210. The O-binary-weight bistable 200 receives the timing signal H and the bistable 210 receives the timing signal 2H.

The NOR-gate 351 provides (I+M) and the NOR-gate 352 provides (J+K+L). The NOR-gate 353 provides the term (6) giving $n_{16}$. The NOR-gate 354 provides the term:

$$n_4 T_4 = (I+M).N.T_4 = \overline{\overline{(I+M)} + \overline{N} + \overline{T_4}}$$

The NOR-gate 355 provides the expression:

$$n_8 T_8 = \overline{(I+J+K+K+M)}.T_8 = \overline{\overline{(I+J+K+L+M)} + \overline{T_8}}$$

The NOR-gate 356 provides the term:

$$n_{12} T_{12} = \overline{\overline{(I+M)} + N + T_{12}} = \overline{\overline{(I+M)} + N + \overline{T_4}}$$

The NOR-gate 357 provides the term (10).

The outputs of the pulse train generators 14', 14 are connected to the chopping gates 5, 5', gate 5 being controlled by the signals H and 2H and gate 5' being controlled by the signals 2H. The chopping provided by gate 5' is therefore twice as fast as the chopping provided by gate 5, with no coincidence between the chopping times.

Although the invention has been fully described in accordance with two embodiments in which the sine curve is sampled in six samples and the sample values are quantized with relatively accurate approximations, the number of samples per cycle and the approximation to sample values can of course be varied without departure from the scope of the invention BO. Also, although the embodiments described make use according to circumstances of a NOR-logic or of a NAND-logic, any known logic could of course be used to resolve the Boolean expressions devised in the specification.

What we claim is:

1. A synthesizer of multifrequency signals formed by a "m out of M" code combination of $m$ concomitant sinusoidal component signals, said m component signals having different frequencies, which are selected from a plurality of M predetermined frequencies, said M frequencies all being equal to sub-multiples of a common clock signal frequency, said synthesizer comprising:
   a generator of a common clock signal frequency of which said component signal frequencies are each sub-multiples;
   selecting means for selecting $m$ of said M predetermined frequencies;
   a plurality of m controlled division factor frequency divider means for converting said common clock signal into m resultant output signals having frequencies respectively equal to said selected predetermined frequencies multiplied by a given factor p;
   a plurality of m scanner means respectively controlled by the output signals from said $m$ frequency divider means;
   each scanner means having a number n of adjacent terminals equal to $p/2 + 1$, if $p$ is even, and equal to $(p + 1)/2$, if $p$ is odd;
   said terminals being given respective addresses;
   said terminals further including an address computer for cyclically applying gating signals to said terminals, alternately, in the address increasing directions and in the address decreasing direction;
   said computer applying gating signals having a duration equal to the $p^{th}$ part of the period of the resultant output signal which controls said scanner means;
   n pulse train generators having recurrence frequencies respectively approximately equal to the values of the amplitude of a sine curve function taken from a tangent to the negative peaks of the sine curve corresponding respectively to $n$ values of the argument of said sine function which is equidistributed in the half cycle of said function;
   said pulse train generators being respectively activated by said gating signals; and,
   means for time-multiplexing the pulses generated by said pulse train generators.

2. A synthesizer of multifrequency signals each formed by a "m out of M" code combination of m concomitant sinusoidal component signals, said $m$ component signals having different frequencies which are selected from a plurality of M predetermined frequencies, said M frequencies all being equal to submultiples of a common clock signal frequency, said synthesizer comprising:
   a generator of a common clock signal frequency of which said component signal frequencies are each submultiples;
   selecting means for selecting $m$ of said M predetermined frequencies;
   a plurality of m controlled division factor frequency divider means for converting said common clock signal into $m$ digital output signals having frequencies respectively equal to said selected predetermined frequencies multiplied by a given factor $p$;
   a plurality of m scanner respectively controlled by the digital output signals from said m frequency divider means;
   each scanner means including a number $n$ of adjacent terminals equal to $p/2 + 1$ if $p$ is even and equal to $(p+1)/2$ if $p$ is odd;
   said terminals being given respective addresses;

a counter controlled by the digital output signals controlling said scanner means, counting from zero to a maximal address and counting back from said maximal address to zero;

means for applying gating signals having a duration equal to the $p^{th}$ part of the period of the digital output signal controlling said scanner means to said terminals when the counter reaches the respective addresses thereof:

$n$ pulse train generators having recurrence frequencies respectively approximate to the values of the amplitude of a sine curve function taken from a tangent to the negative peaks of the sine cure corresponding respectively to $n$ values of the argument of said sine function equidistributed in the half cycle of said function;

said pulse train generators being respectively activated by said gating signals; and, means for time-multiplexing the pulses generated by said pulse train generators.

3. A synthesizer of multifrequency signals each formed by a "$m$ out of M" code combination of $m$ concomitant sinusoidal component signals, said m component signals having different frequencies which are selected from a plurality of M predetermined frequencies, said M all being equal to submultiples of a common clock signal frequency, said synthesizer comprising:

a generator of a common clock signal frequency of which said component signal frequencies are each sub-multiples;

selecting means for selecting $m$ of said M predetermined frequencies;

a plurality of m controlled division factor frequency divider means for converting said common clock signal into $m$ resultant output signals having frequencies respectively equal to said selected predetermined frequencies multipled by twelve;

a plurality of m scanner means respectively controlled by the output signal from said $m$ frequency divider means;

scanner means having seven adjacent terminals which are given respective addresses;

said terminals further including an address computer for cyclically applying gating signals to said terminals, alternately in the address increasing direction and in the address decreasing direction;

said computer applying gating signals having a duration equal to the twelfth parth of the period of the resultant output signal which controls said scanner means;

seven pulse train generators having recurrence frequencies respectively proportional to 0, 1, 4, 8, 12, 15, 16 which values are approximately equal to the amplitudes of a sine curve function taken from a tangent to the negative peaks of the sine curve and corresponding respectively to values of the argument of the sine function which is equal to ($-\pi/2$ and $3\pi/2$), ($-\pi/3$ and $4\pi/3$), ($-\pi/6$ and $7\pi/6$), (0 and $\pi$), ($\pi/6$ and $5\pi/6$), ($\pi/3$ and $2\pi/3$), $\pi/2$;

said pulse train generators being respectively activated by said gating signals; and, means for time-multiplexing the pulses generated by said pulse train generators.

4. A synthesizer of multifrequency signals each formed by a "$m$ out of M" code combination of m concomitant sinusoidal component signals, said $m$ component signals having different frequencies which are selected from a plurality of M predetermined frequencies which are all equal sub-multiples of a common clock signal frequency, said synthesizer comprising:

a generator of a common clock signal frequency of which said component signal frequencies are each sub-multiples;

means for selecting $m$ of said M predetermined frequencies;

a plurality of $m$ controlled division factor frequency divider means for converting said clock signal into m resultant output signals having frequencies respectively equal to said selected predetermined frequencies multiplied by twelve;

a plurality of $m$ scanner means respectively controlled by said m frequency divider means resultant output signals;

each scanner means having seven adjacent terminals which are given respective addresses and including an address computer for cylically applying gating signals to said terminals, alternately in the address increasing direction and in the address decreasing direction;

said computer applying gating signals having a duration equal to the twelfth part of the period of the resultant output signal controlling said scanner means;

seven pulse train generators having recurrence frequencies respectively proportional to 0, 0, 4, 8, 12, 16, 16 which values are approximate to the amplitudes of a sine curve function taken from a tangent to the negative peaks of the sine curve and corresponding respectively to values of the argument of the sine function equal to ($-\pi/2$ and $3\pi/2$), ($-\pi/3$ and $4\pi/3$), ($-\pi/6$ and $7\pi/6$), (0 and $\pi$), ($\pi/6$ and $5\pi/6$), ($\pi/3$ and $2\pi/3$), $\pi/2$;

said pulse train generators being respectively activated by said gating signals; and, means for time-multiplexing the pulses generated by said pulse train generators.

5. A synthesizer of multifrequency signals each formed by two concomitant sinusoidal component signals, the first one having a low frequency which is selected from a plurality of predetermined low frequencies and the second one having a high frequency selected from a plurality of predetermined high frequencies, said low and high frequencies being equal to sub-multiples of a common clock signal frequency, said synthesizer comprising:

a generator of a common clock signal frequency of which said predetermined low and high frequencies are each sub-multiples;

means for selecting one of said predetermined low frequencies and one of said predetermined high frequencies;

two controlled division factor frequency divider means for converting said clock signal into two resultant output signals having frequencies respectively equal to said selected predetermined low frequency multiplied by a given factor $p$ and said selected predetermined high frequency multiplied by said given factor $p$;

two scanner means respectively controlled by said two frequency divider means resultant output signals;

each scanner means having a number n of adjacent terminals which are given respective addresses, $n$ being equal to $p/2 + 1$, if $p$ is even, and to $(p + 1)/2$, if $p$ is odd, and including an address computer for cyclically applying gating signals to said terminals, alternately in the address increasing direction and in the address decreasing direction;

said gating signals having a duration equal to the $p^{th}$ part of the period of the resultant output signal controlling said scanner means;

$n$ pulse train generators having recurrence frequencies respectively approximate to the values of the amplitude of a sine curve function taken from a tangent to the negative peaks of the sine curve corresponding respectively to $n$ values of the argument of said sine function equidistributed in the half cycle of said function;

said pulse train generators being respectively activated by said gating signals; and, means for time-multiplexing the pulses generated by said pulse train generators.

6. A synthesizer of multifrequency signals as set forth in claim 5, in which the low frequency which is selected from the low frequencies 697, 770, 852 and 941 Hz respectively equal to the sub-multiples 40, 36, 33, 30 of the common clock signal frequency at 27800 Hz and the high frequency which is selected from the high frequencies 1209, 1336, 1477 and 1633 Hz respectively equal to the sub-multiples 23, 21, 19, 17 of the common clock signal frequency 27800 Hz.

* * * * *